(12) United States Patent
Xu et al.

(10) Patent No.: US 9,906,166 B2
(45) Date of Patent: Feb. 27, 2018

(54) METHOD AND DEVICE FOR CONTROLLING OPERATION OF INVERTER

(71) Applicant: SUNGROW POWER SUPPLY CO., LTD., Hefei, Anhui (CN)

(72) Inventors: Jun Xu, Anhui (CN); Jinhu Cao, Anhui (CN); Peng Chen, Anhui (CN); Peng Wang, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/581,723

(22) Filed: Apr. 28, 2017

(65) Prior Publication Data

US 2018/0026549 A1   Jan. 25, 2018

(30) Foreign Application Priority Data

Jul. 25, 2016  (CN) .......................... 2016 1 0591490

(51) Int. Cl.
*H02M 7/537* (2006.01)
*H02M 7/487* (2007.01)
*H02J 3/38* (2006.01)

(52) U.S. Cl.
CPC ............. *H02M 7/537* (2013.01); *H02J 3/385* (2013.01); *H02M 7/487* (2013.01)

(58) Field of Classification Search
CPC ............ H02M 7/42; H02M 7/44; H02M 7/48; H02M 7/483; H02M 7/487; H02M 7/515;

(Continued)

(56) References Cited

U.S. PATENT DOCUMENTS 9,407,164 B2 *  8/2016  Chang ..................... H02J 3/385
9,570,998 B2 *  2/2017  Mueller .................. H02M 1/10

(Continued)

FOREIGN PATENT DOCUMENTS

CN       105141158 A    12/2015
EP         2611021 A1     7/2013

(Continued)

OTHER PUBLICATIONS

Extended European Search Report corresponding to Application No. 17168815.3-1809; dated Nov. 7, 2017.

*Primary Examiner* — Timothy J Dole
*Assistant Examiner* — Shahzeb K Ahmad
(74) *Attorney, Agent, or Firm* — Cantor Colburn LLP (57) ABSTRACT

Provided are a method and a device for controlling an operation of an inverter. The method includes: determining whether a direct current side voltage of the inverter is greater than an operation voltage setting threshold; and if no, controlling the inverter to operate according to a five level control strategy; and if yes: adjusting the direct current side voltage by using a maximum power tracking algorithm; adjusting linearly a floating capacitor voltage of the inverter based on the adjusted direct current side voltage; determining whether the adjusted floating capacitor voltage is in a preset range; and if yes, controlling the inverter to operate according to a five level control strategy; and if no, controlling the inverter to operate according to a seven level control strategy.

14 Claims, 8 Drawing Sheets (58) Field of Classification Search
CPC ...... H02M 7/521; H02M 7/537; H02M 7/538; H02M 7/53846; H02M 7/66; H02M 7/757; H02M 2007/4835; H02M 2001/0003; Y02B 70/10; Y02B 70/14; Y02B 70/1441; H02J 3/385
See application file for complete search history.

(56) References Cited

U.S. PATENT DOCUMENTS

| | | | | |
|---|---|---|---|---|
| 2013/0249322 A1* | 9/2013 | Zhang | ............... | H02M 7/483 307/151 |
| 2013/0290743 A1* | 10/2013 | Lee | ............... | G06F 1/263 713/300 |
| 2014/0029308 A1* | 1/2014 | Cojocaru | ............... | H01G 4/38 363/13 |
| 2015/0311776 A1* | 10/2015 | Lavieville | ............... | H02M 7/487 363/65 |
| 2016/0352251 A1* | 12/2016 | Li | ............... | H02M 7/487 |

FOREIGN PATENT DOCUMENTS

| | | |
|---|---|---|
| EP | 2784926 A2 | 10/2014 |
| EP | 3010137 A1 | 4/2016 |

\* cited by examiner

METHOD AND DEVICE FOR CONTROLLING OPERATION OF INVERTER

CROSS REFERENCE TO RELATED APPLICATION

The present application claims the priority to Chinese Patent Application No. 201610591490.6, titled "METHOD AND DEVICE FOR CONTROLLING OPERATION OF INVERTER", filed on Jul. 25, 2016 with the State Intellectual Property Office of the PRC, which is incorporated herein by reference in its entirety.

FIELD

The present disclosure relates to a field of inverter control, and more particularly to a method and a device for controlling an operation of an inverter.

BACKGROUND

With development of a photovoltaic industry, a system voltage of a photovoltaic assembly increases from 1000V to 1500V. In order to fit a photovoltaic assembly with a system voltage being 1500V, an inverter connected to the photovoltaic assembly generally adopts a five level topology structure.

Figure 1:
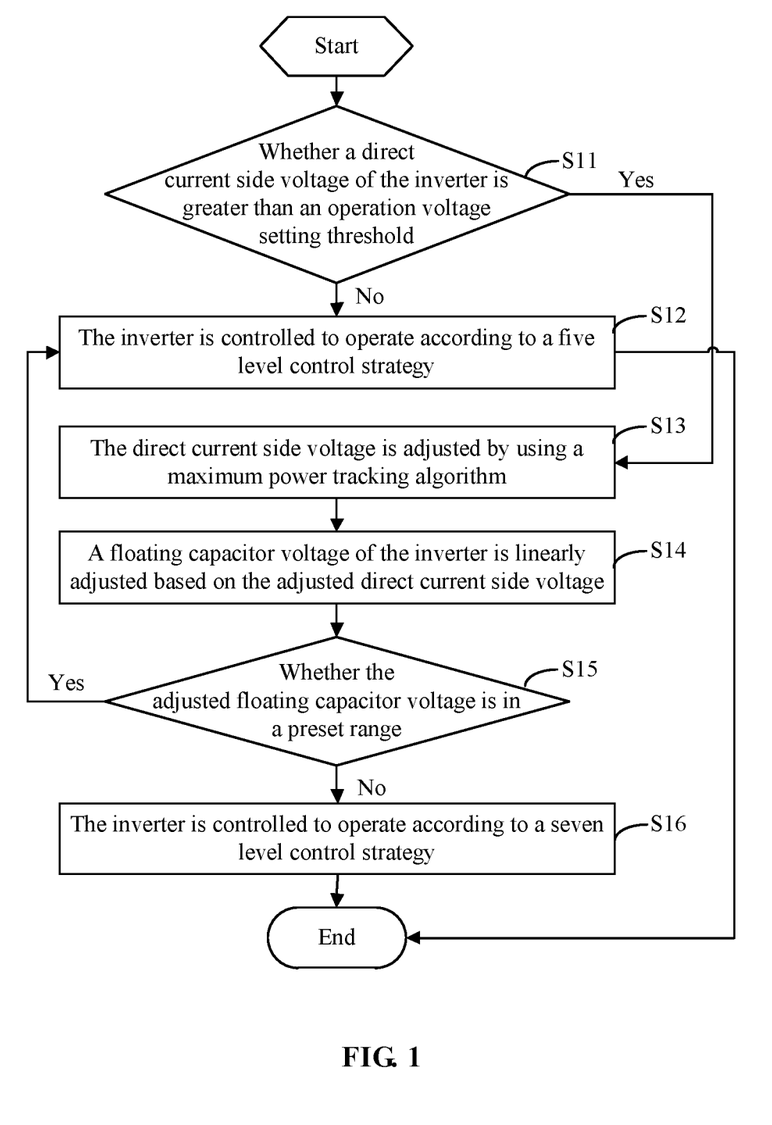
FIG. 1 is a flowchart of a method for controlling an operation of an inverter according to the disclosure.

When the inverter with the five level topology structure normally operates, the inverter operates in a five level operation mode, that is, the inverter alternately outputs five different levels in different switching state combinations of switching transistors. As shown in FIG. 1, a floating capacitor voltage $U_{fc}$ is $U_{dc}/4$ when the inverter with the five level topology structure normally operates. For an output voltage $U_{AN}$ of the inverter, the output voltage has five levels respectively being $+U_{dc}/2$ (S1 and S7 are switched on), $+U_{dc}/4$ (S1 and S8 are switched on or S4, S5 and S7 are switched on), 0 (S2, S3 and S7 are switched on or S4, S5 and S8 are switched on), $-U_{dc}/4$ (S6 and S7 are switched on or S2, S3 and S8 are switched on) and $-U_{dc}/2$ (S6 and S8 are switched on). S1, S2, S3, S4, S5, S6, S7 and S8 are all switching transistors, $U_{dc}$ is an operation voltage setting threshold when the inverter with the five level topology structure normally operates, $U_{dc}$ is less than 1500V and $U_{dc}$ generally ranges from 800V to 1300V.

However, when the inverter starts operation, a direct current side voltage of the inverter is an open-circuit voltage which is 1500V, in order to avoid voltage stresses of the switching transistors S1 and S6 exceeding a withstanding range, the floating capacitor voltage $U_{fc}$ is pre-charged to a preset value (such as 450V). In this case, the inverter alternately outputs seven different levels in different switching state combinations of switching transistors. For example, the floating capacitor voltage $U_{fc}$ is pre-charged to 450V that is $3U_{dc}/10$, the output voltage $U_{AN}$ of the inverter in FIG. 1 may have seven levels respectively being $+U_{dc}/2$ (S1 and S7 are switched on), $+U_{dc}/5$ (S1 and S8 are switched on), $+3U_{dc}/10$ (S4, S5 and S7 are switched on), 0 (S2, S3 and S7 are switched on or S4, S5 and S8 are switched on), $-2U_{dc}/10$ (S6 and S7 are switched on), $-3U_{dc}/10$ (S2, S3 and S8 are switched on) and $-U_{dc}/2$ (S6 and S8 are switched on), $U_{dc'}$ is 1500V. In this case, if the inverter is still controlled to operate in the five level operation mode, an output current of the inverter may be severely distorted, thereby affecting an operation stability of a whole photovoltaic system.

SUMMARY

In order to solve the above technical problem, a method and a device for controlling an operation of an inverter is provided according to embodiments of the disclosure to achieve an objection of preventing an output current of an inverter from being distorted caused by the inverter still being controlled according to a five level control strategy in a case that a floating capacitor voltage of the inverter being not in a preset range, thereby improving an operation stability of a whole photovoltaic system. Technical solutions are described as follows.

A method for controlling an operation of an inverter includes:

determining whether a direct current side voltage of the inverter is greater than an operation voltage setting threshold; and in a case that the direct current side voltage of the inverter is not greater than the operation voltage setting threshold, controlling the inverter to operate according to a five level control strategy; and in a case that the direct current side voltage of the inverter is greater than the operation voltage setting threshold:

adjusting the direct current side voltage by using a maximum power tracking algorithm;

adjusting linearly a floating capacitor voltage of the inverter based on the adjusted direct current side voltage;

determining whether the adjusted floating capacitor voltage is in a preset range, where the preset range ranges from a quarter of the operation voltage setting threshold minus a preset threshold to a quarter of the operation voltage setting threshold plus the preset threshold; and controlling the inverter to operate according to a five level control strategy in a case that the adjusted floating capacitor voltage is in the preset range; and controlling the inverter to operate according to a seven level control strategy in a case that the adjusted floating capacitor voltage is not in the preset range.

Preferably, after controlling the inverter to operate according to the five level control strategy, the method further includes:

determining whether the direct current side voltage is greater than a first preset voltage, where the first preset voltage is greater than the operation voltage setting threshold; and executing a step of adjusting the direct current side voltage by using the maximum power tracking algorithm in a case that the direct current side voltage is greater than the first preset voltage; and controlling the inverter to operate according to the five level control strategy in a case that the direct current side voltage is not greater than the first preset voltage.

Preferably, the adjusting linearly the floating capacitor voltage of the inverter based on the adjusted direct current side voltage includes:

substituting the adjusted direct current side voltage into a preset linear relation formula to obtain a to-be-used floating capacitor voltage; and adjusting the floating capacitor voltage to the to-be-used floating capacitor voltage.

Preferably, the preset linear relation formula is $$Y = \frac{U_{dc1} * U_{fc2} - U_{fc1} * U_{dc2}}{U_{dc1} - U_{dc2}} + \frac{U_{fc1} - U_{fc2}}{U_{dc1} - U_{dc2}} X,$$

where $U_{dc1}$ is a direct current side open-circuit voltage of the inverter, $U_{fc1}$ is a floating capacitor voltage corresponding to the direct current side open-circuit voltage of the inverter, $U_{dc2}$ is the operation voltage setting threshold, $U_{fc2}$ a floating capacitor voltage corresponding to the operation voltage setting threshold, X is the direct current side voltage of the inverter and Y is the floating capacitor voltage of the inverter.

A device for controlling an operation of an inverter includes:

a first determining unit, configured to determine whether a direct current side voltage of the inverter is greater than an operation voltage setting threshold, where a first controlling unit is executed in a case that the direct current side voltage of the inverter is not greater than the operation voltage setting threshold, and a first adjusting unit is executed in a case that the direct current side voltage of the inverter is greater than the operation voltage setting threshold;

the first controlling unit, configured to control the inverter to operate according to a five level control strategy;

the first adjusting unit, configured to adjust the direct current side voltage by using a maximum power tracking algorithm;

a second adjusting unit, configured to adjust linearly a floating capacitor voltage of the inverter based on the adjusted direct current side voltage;

a second determining unit, configured to determine whether the adjusted floating capacitor voltage is in a preset range, where the preset range ranges from a quarter of the operation voltage setting threshold minus a preset threshold to a quarter of the operation voltage setting threshold plus the preset threshold, and where the first controlling unit is executed in a case that the adjusted floating capacitor voltage is in the preset range, and a second controlling unit is executed in a case that the adjusted floating capacitor voltage is not in the preset range; and the second controlling unit, configured to control the inverter to operate according to a seven level control strategy.

Preferably, the device further includes a third determining unit, configured to determine whether the direct current side voltage is greater than a first preset voltage, where the first preset voltage is greater than the operation voltage setting threshold, and where the first adjusting unit is executed in a case that the direct current side voltage is greater than the first preset voltage, and the first controlling unit is executed in a case that the direct current side voltage is not greater than the first preset voltage.

Preferably, the second adjusting unit includes:

a calculating subunit, configured to substitute the adjusted direct current side voltage into a preset linear relation formula to obtain a to-be-used floating capacitor voltage; and an adjusting subunit, configured to adjust the floating capacitor voltage to the to-be-used floating capacitor voltage.

Preferably, the calculating subunit is specifically configured to substitute the adjusted direct current side voltage into to $$Y = \frac{U_{dc1}*U_{fc2} - U_{fc1}*U_{dc2}}{U_{dc1} - U_{dc2}} + \frac{U_{fc1} - U_{fc2}}{U_{dc1} - U_{dc2}}X$$

to obtain a to-be-used floating capacitor voltage, where $U_{dc1}$ is a direct current side open-circuit voltage of the inverter, $U_{fc1}$ is a floating capacitor voltage corresponding to the direct current side open-circuit voltage of the inverter, $U_{dc2}$ is the operation voltage setting threshold, $U_{fc2}$ a floating capacitor voltage corresponding to the operation voltage setting threshold, X is the direct current side voltage of the inverter and Y is the floating capacitor voltage of the inverter.

An inverter includes any one of the above devices for controlling an operation of an inverter.

A photovoltaic power generation system includes the above inverter.

Compared with the conventional technology, the disclosure has the following advantages. In the disclosure, it is firstly determined whether a direct current side voltage of an inverter is greater than an operation voltage setting threshold. In a case that it is determined that the direct current side voltage is greater than the operation voltage setting threshold, the direct current side voltage of the inverter may be an open-circuit voltage which is 1500V (for example when the inverter starts operation, the direct current side voltage of the inverter is the open-circuit voltage). The inverter alternatively outputs seven different levels. Since a normal operation mode of the inverter is a five level operation mode, in this case, the direct current side voltage is adjusted by using a maximum power tracking algorithm and a floating capacitor voltage of the inverter is linearly adjusted based on the adjusted direct current side voltage, the floating capacitor voltage is adjusted to be in a preset range so to convert the inverter from a seven level operation mode to the five level operation mode. In a case that the floating capacitor voltage is adjusted to be in the preset range, the inverter is controlled to operate according to the five level control strategy. In a case that the floating capacitor voltage is not adjusted to be in the preset range, the inverter is controlled to operate according to the seven level control strategy rather than the five level control strategy to prevent an output current of the inverter from being distorted caused by the inverter still being controlled according to the five level control strategy in a case that the floating capacitor voltage of the inverter being not in the preset range, thereby improving an operation stability of a whole photovoltaic system.

BRIEF DESCRIPTION OF THE DRAWINGS

In order to describe technical solutions in embodiments of the present disclosure more clearly, hereinafter drawings to be used in the description of the embodiments are introduced simply. Apparently, the drawings described below only describe some embodiments of the present disclosure. Those skilled in the art can obtain other drawings based on these drawings without any creative work.

DETAILED DESCRIPTION OF EMBODIMENTS

Technical solutions of embodiments of the present disclosure will be described clearly and completely below in conjunction with the drawings of the embodiments of the disclosure. Apparently, the described embodiments are some rather than all of the embodiments of the present disclosure. Any other embodiments obtained based on the embodiments of the present disclosure by those skilled in the art without any creative work fall within the protection scope of the present disclosure.

Embodiment 1

Reference is made to FIG. 1, which is a flowchart of a method for controlling an operation of an inverter according to the disclosure. The method may include steps S11 to S16.

In step S11, it is determined whether a direct current side voltage of the inverter is greater than an operation voltage setting threshold. Step S12 is executed in a case that the direct current side voltage of the inverter is not greater than the operation voltage setting threshold. And step S13 is executed in a case that the direct current side voltage of the inverter is greater than the operation voltage setting threshold.

It should be noted that, in a case that the direct current side voltage of the inverter is not greater than the operation voltage setting threshold, a voltage stress of each switching transistor in the inverter is in a withstanding range. The inverter operates in a five level operation mode, so step S12 is executed.

In a case that the direct current side voltage of the inverter is greater than the operation voltage setting threshold, the voltage stress of the switching transistor in the inverter may exceed the withstanding range of the switching transistor. In this case, in order to prevent the voltage stress of the switching transistor from exceeding the withstanding range of the switching transistor, the inverter does not operate in the five level operation mode (For example, when the inverter starts operation, the direct current side voltage of the inverter is an open-circuit voltage which is 1500V. In order to prevent voltage stresses of the switching transistor S1 and the switching transistor S6 exceeding the withstanding range, a floating capacitor voltage $U_{fc}$ is pre-charged to a preset value (such as 450V). In this case, the inverter alternately outputs seven different levels in different switching state combinations of switching transistors). So the inverter is not controlled to operate according to a five level control strategy and step S13 is executed.

The operation voltage setting threshold is generally 1200V.

In step S12, the inverter is controlled to operate according to a five level control strategy.

In this embodiment, in a case that the inverter is controlled to operate according to the five level control strategy, the inverter operates in the five level operation mode.

A specific process of controlling the inverter to operate according to the five level control strategy includes: adjusting a duty cycle of the inverter according to $U_{fc}=\frac{1}{4}U_{dc1}$ to make the inverter alternately output five levels respectively being 0, $\pm\frac{1}{4}U_{dc1}$, $\pm\frac{1}{2}U_{dc1}$ in different switching state combinations of switching transistors. $U_{dc1}$ is the direct current side voltage of the inverter.

In step 13, the direct current side voltage is adjusted by using a maximum power tracking algorithm.

In this embodiment, adjusting the direct current side voltage by using the maximum power tracking algorithm includes: tracking an output power of the inverter by using the maximum power tracking algorithm until a maximum output power of the inverter is tracked, and adjusting the direct current side voltage based on the tracked output power.

A specific process of tracking an output power of the inverter by using the maximum power tracking algorithm until a maximum output power of the inverter is tracked and adjusting the direct current side voltage based on the tracked output power in the disclosure is the same as a process of tracking an output power of the inverter by using the maximum power tracking algorithm until a maximum output power of the inverter is tracked and adjusting the direct current side voltage based on the tracked output power in the conventional technology, which is not described here.

In step S14, a floating capacitor voltage of the inverter is linearly adjusted based on the adjusted direct current side voltage.

In step S15, it is determined whether the adjusted floating capacitor voltage is in a preset range. The preset range ranges from a quarter of the operation voltage setting threshold minus a preset threshold to a quarter of the operation voltage setting threshold plus the preset threshold. Step S12 is executed in a case that the adjusted floating capacitor voltage is in the preset range, or step S16 is executed in a case that the adjusted floating capacitor voltage is not in the preset range.

In a case that the adjusted floating capacitor voltage is not in the preset range, in order to prevent the voltage stress of the switching transistor from exceeding the withstanding range of the switching transistor, the inverter has to operate in a seven level operation mode, so step S16 is executed.

In step S16, the inverter is controlled to operate according to a seven level control strategy.

In this embodiment, in a case that the inverter is controlled to operate in the seven level control strategy, the inverter operates in a seven level operation mode.

A specific process of controlling the inverter to operate according to the seven level control strategy includes: adjusting a duty cycle of the inverter according to a requirement of the seven level operation mode to make the inverter alternately output seven different levels in different switching state combinations of switching transistors. For example, when the inverter starts operation, the direct current side voltage of the inverter is an open-circuit voltage which is 1500V. In order to prevent a voltage stress of the switching transistor from exceeding the withstanding range, a floating capacitor voltage $U_{fc}$ is pre-charged to 450V which is $3U_{dc2}/10$. A voltage outputted by the inverter may be respectively $+U_{dc2}/2$, $+U_{dc2}/5$, $+3U_{dc2}/10$, 0, $-2U_{dc2}/10$, $-3U_{dc2}/10$ and $-U_{dc2}/2$. $U_{dc2}$ is the open-circuit voltage which is 1500V.

A current flowing path in a case that the inverter operates in the seven level operation mode is the same as a current flowing path in a case that the inverter operates in the five level operation mode.

Figure 2A:
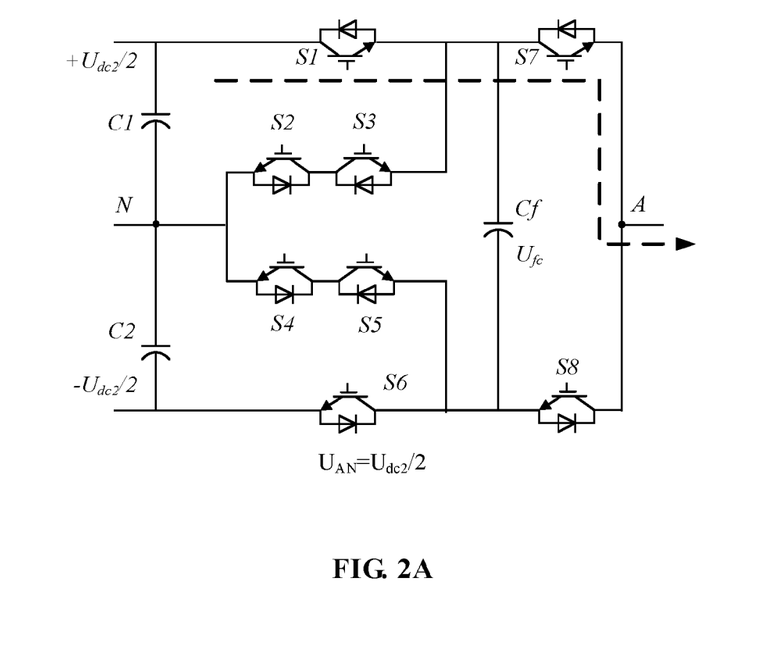
FIG. 2A to FIG. 2H are schematic diagrams of an current flowing path in a case that an inverter operates in a seven level operation mode according to the disclosure.
Figure 2B:
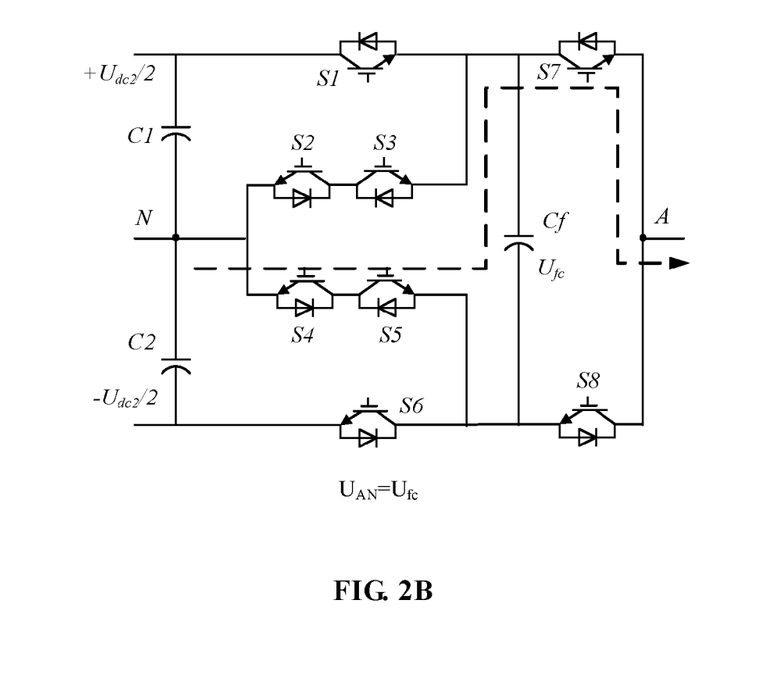
Figure 2C:
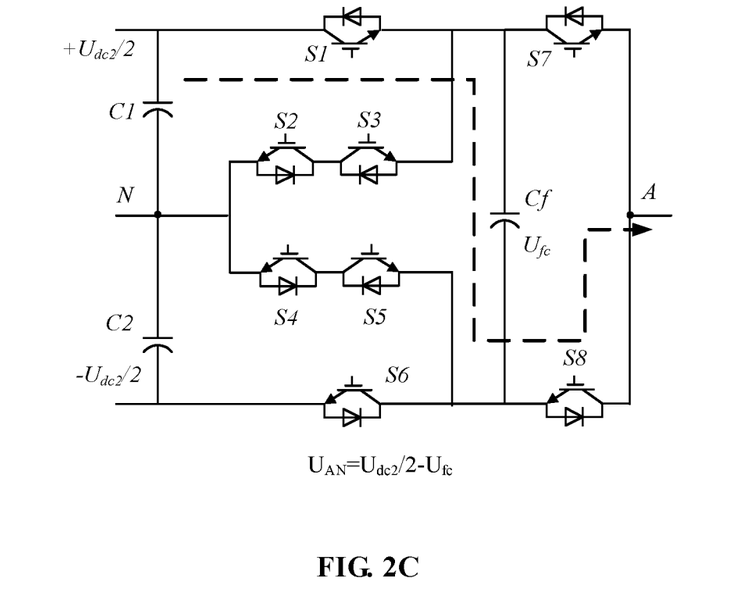
Figure 2D:
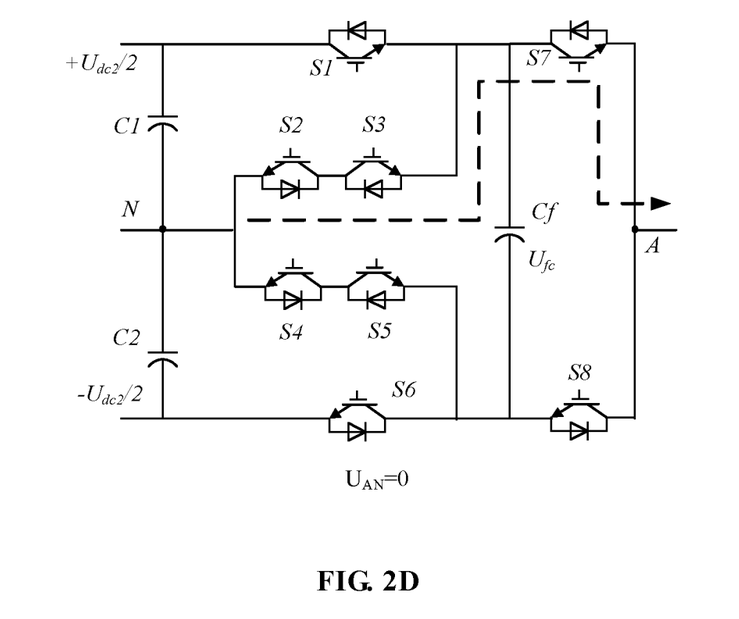
Figure 2E:
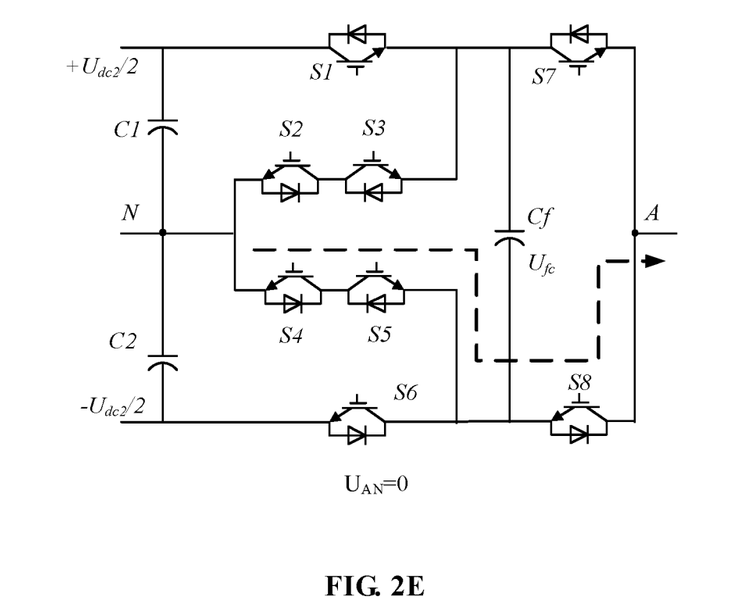
Figure 2F:
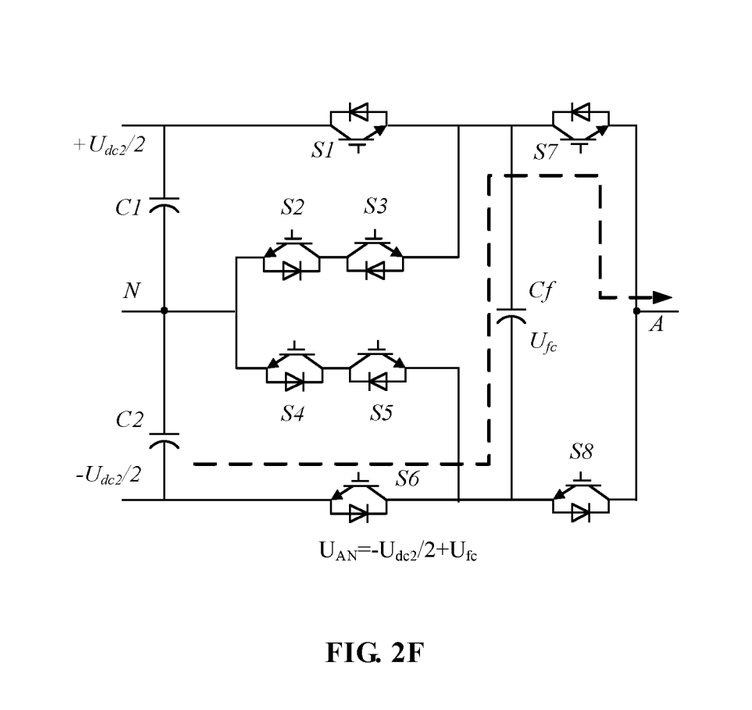
Figure 2G:
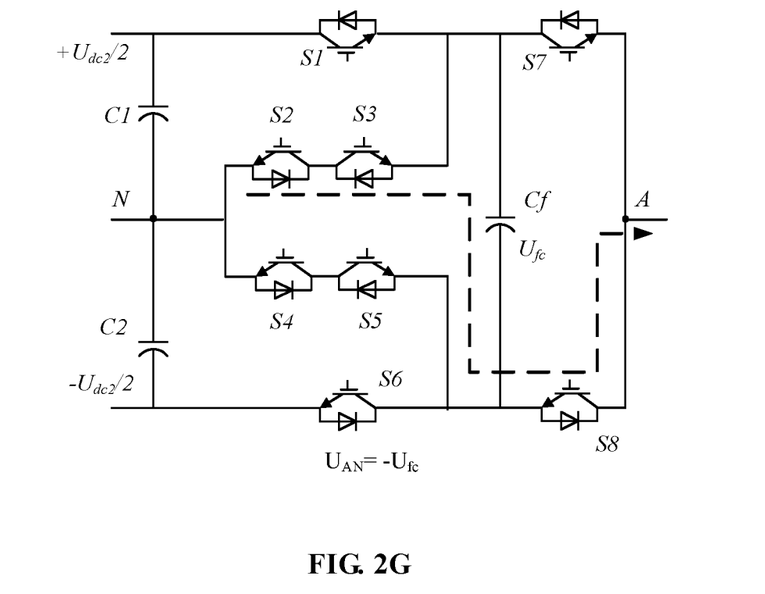
Figure 2H:
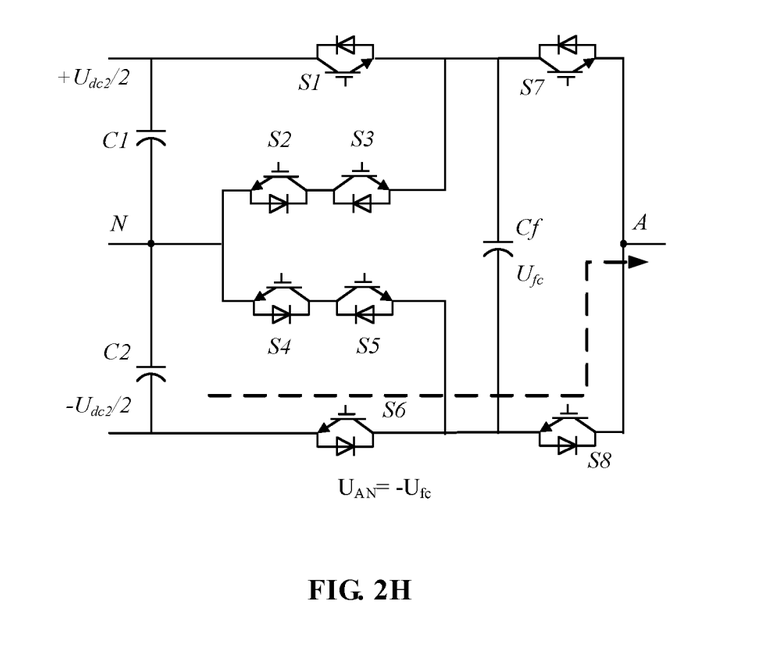

An example is taken to illustrate the current flowing path in a case that the inverter operates in the seven level operation mode. For example, when the inverter starts operation, the direct current side voltage of the inverter is an open-circuit voltage which is 1500V. In order to prevent voltage stresses of the switching transistor S1 and the switching transistor S6 from exceeding the withstanding range, a floating capacitor voltage $U_{fc}$ is pre-charged to 450V which is $3U_{dc2}/10$. Reference is made to FIG. 2A to FIG. 2H. As shown in FIG. 2A, the switching transistors S1 and S7 are switched on, the output voltage of the inverter is $U_{AN}=U_{dc2}/2$. As shown in FIG. 2B, the switching transistors S4, S5 and S7 are switched on, the output voltage of the inverter is $U_{AN}=U_{fc}$, i.e., $(+3U_{dc2}/10)$. As shown in FIG. 2C, the switching transistors S1 and S8 are switched on, the output voltage of the inverter is $U_{AN}=U_{dc2}/2-U_{fc}$. As shown in FIG. 2D, the switching transistors S2, S3 and S7 are switched on, the output voltage of the inverter is $U_{AN}=0$. As shown in FIG. 2E, the switching transistors S4, S5 and S8 are switched on, the output voltage of the inverter is $U_{AN}=0$. As shown in FIG. 2F, the switching transistors S6 and S7 are switched on, the output voltage of the inverter is $U_{AN}=-U_{dc2}/2+U_{fc}$. As shown in FIG. 2G the switching transistors S2, S3 and S8 are switched on, the output voltage of the inverter is $U_{AN}=-U_{fc}$. As shown in FIG. 2H, the switching transistors S6 and S8 are switched on, the output voltage of the inverter is $U_{AN}=-U_{dc2}/2$.

In the disclosure, it is firstly determined whether a direct current side voltage of an inverter is greater than an operation voltage setting threshold. In a case that it is determined that the direct current side voltage is greater than the operation voltage setting threshold, the direct current side voltage of the inverter may be an open-circuit voltage which is 1500V (for example when the inverter starts operation, the direct current side voltage of the inverter is the open-circuit voltage). The inverter alternatively outputs seven different levels. Since a normal operation mode of the inverter is a five level operation mode, in this case, the direct current side voltage is adjusted by using a maximum power tracking algorithm and a floating capacitor voltage of the inverter is linearly adjusted based on the adjusted direct current side voltage, the floating capacitor voltage is adjusted to be in a preset range so to convert the inverter from a seven level operation mode to the five level operation mode. In a case that the floating capacitor voltage is adjusted to be in the preset range, the inverter is controlled to operate according to the five level control strategy. In a case that the floating capacitor voltage is not adjusted to be in the preset range, the inverter is controlled to operate according to the seven level control strategy rather than the five level control strategy to prevent an output current of the inverter from being distorted caused by the inverter still being controlled according to the five level control strategy in a case that the floating capacitor voltage of the inverter being not in the preset range, thereby improving an operation stability of a whole photovoltaic system.

Embodiment 2

Figure 3:
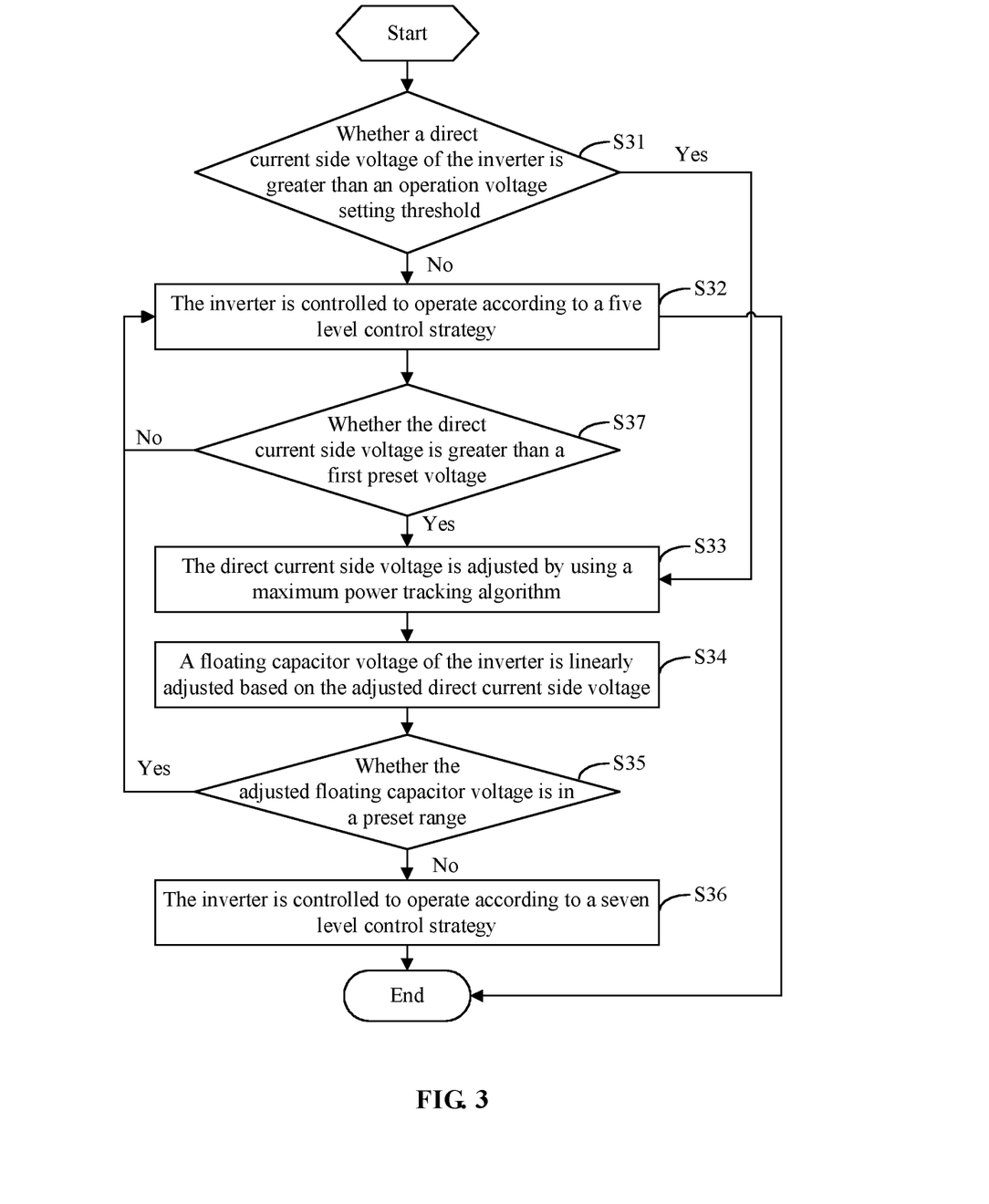
FIG. 3 is another flowchart of a method for controlling an operation of an inverter according to the disclosure.

In this embodiment, another method for controlling an operation of an inverter is provided based on the method for controlling an operation of an inverter shown in FIG. 1. Reference is made to FIG. 3, the method may include steps S31 to S37.

In step S31, it is determined whether a direct current side voltage of the inverter is greater than an operation voltage setting threshold. Step S32 is executed in a case that the direct current side voltage of the inverter is not greater than the operation voltage setting threshold. And step S33 is executed in a case that the direct current side voltage of the inverter is greater than the operation voltage setting threshold.

In step S32, the inverter is controlled to operate according to a five level control strategy.

In step 33, the direct current side voltage is adjusted by using a maximum power tracking algorithm.

In step S34, a floating capacitor voltage of the inverter is linearly adjusted based on the adjusted direct current side voltage.

In step S35, it is determined whether the adjusted floating capacitor voltage is in a preset range. The preset range ranges from a quarter of the operation voltage setting threshold minus a preset threshold to a quarter of the operation voltage setting threshold plus the preset threshold. Step S32 is executed in a case that the adjusted floating capacitor voltage is in the preset range and step S36 is executed in a case that the adjusted floating capacitor voltage is not in the preset range.

In step S36, the inverter is controlled to operate according to a seven level control strategy.

A specific process of step S31 to step S36 is the same as a process of step S11 to step S16 of the method for controlling an operation of an inverter shown in FIG. 1, which is not described here.

In step S37, it is determined whether the direct current side voltage is greater than a first preset voltage. The first preset voltage is greater than the operation voltage setting threshold. Step S33 is executed in a case that the direct current side voltage is greater than the first preset voltage, and step S32 is executed in a case that the direct current side voltage is not greater than the first preset voltage.

After the inverter is controlled to operate in the five level operation mode according to the five level control strategy, it is considered that a low temperature makes an effect on a photovoltaic assembly, which may cause an output voltage of the inverter rise from an operation voltage setting threshold (such as 1200 V) to a first preset voltage (such as 1300V) or more. When the output voltage of the inverter rises from the operation voltage setting threshold to the first preset voltage or more, regarding an influence of a voltage spike under full power, a voltage stress of the switching transistor in the inverter rises and may even exceed a voltage stress withstanding range of the switching transistor. In this case, a floating capacitor voltage of the inverter needs to be adjusted to lower the voltage stress of the switching transistor and further ensure an operation stability of a photovoltaic system. Specifically, step S37 is executed after step S32.

The above preset threshold is influenced by a specific circuit of an inverter or a photovoltaic system, the preset threshold may be variable. The above preset threshold may be, but not limited to, 20V.

Figure 4:
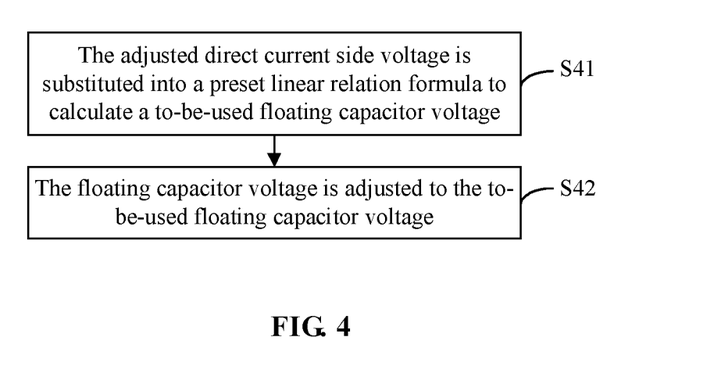
FIG. 4 is a sub-flowchart of a method for controlling an operation of an inverter according to the disclosure.

In the embodiment 1 and the embodiment 2, a process of adjusting linearly the floating capacitor voltage of the inverter based on the adjusted direct current side voltage may be referred to FIG. 4 and may include steps S41 and S42.

In step S41, the adjusted direct current side voltage is substituted into a preset linear relation formula to calculate a to-be-used floating capacitor voltage.

The preset linear relation formula is obtained based on the above operation voltage setting threshold, a floating capacitor voltage corresponding to the above operation voltage setting threshold, the direct current side voltage of the inverter (that is the open-circuit voltage) when the inverter starts operation and a floating capacitor voltage corresponding to the direct current side voltage of the inverter when the inverter starts operation.

In particular, the preset linear relation formula may be $$Y = \frac{U_{dc1} * U_{fc2} - U_{fc1} * U_{dc2}}{U_{dc1} - U_{dc2}} + \frac{U_{fc1} - U_{fc2}}{U_{dc1} - U_{dc2}} X,$$

where $U_{dc1}$ is a direct current side open-circuit voltage of the inverter, $U_{fc1}$ is a floating capacitor voltage corresponding to the direct current side open-circuit voltage of the inverter, $U_{dc2}$ is the operation voltage setting threshold, $U_{fc2}$ a floating capacitor voltage corresponding to the operation voltage setting threshold, X is the direct current side voltage of the inverter and Y is the floating capacitor voltage of the inverter.

In step S42, the floating capacitor voltage is adjusted to the to-be-used floating capacitor voltage.

Embodiment 3

Figure 5:
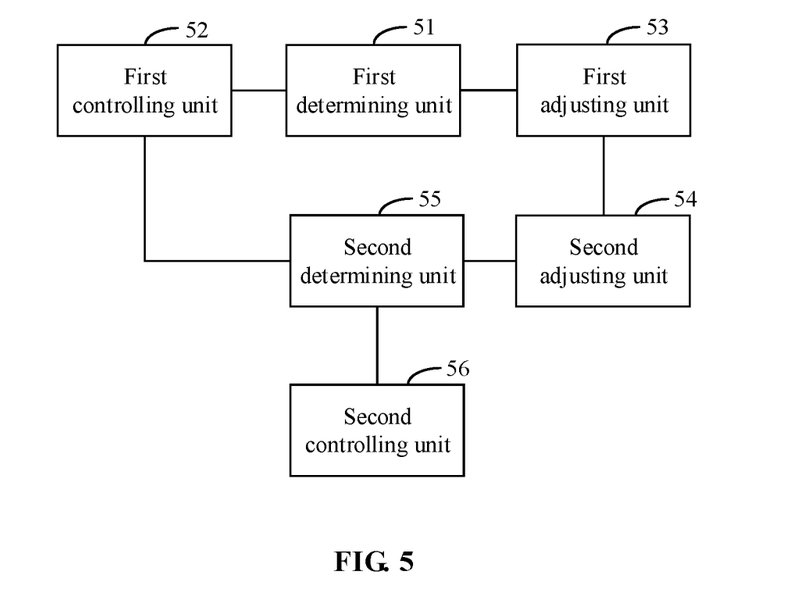
FIG. 5 is a schematic logic structural diagram of a device for controlling an operation of an inverter according to the disclosure.

Corresponding to the above method embodiments, a device for controlling an operation of an inverter is provided according to this embodiment. Referring to FIG. 5, the device for controlling an operation of an inverter includes: a first determining unit 51, a first controlling unit 52, a first adjusting unit 53, a second adjusting unit 54, a second determining unit 55 and a second controlling unit 56.

The first determining unit 51 is configured to determine whether a direct current side voltage of the inverter is greater than an operation voltage setting threshold. The first controlling unit 52 is executed in a case that the direct current side voltage of the inverter is not greater than the operation voltage setting threshold, and the first adjusting unit 53 is executed in a case that the direct current side voltage of the inverter is greater than the operation voltage setting threshold.

The first controlling unit 52 is configured to control the inverter to operate according to a five level control strategy.

The first adjusting unit 63 is configured to adjust the direct current side voltage by using a maximum power tracking algorithm.

The second adjusting unit 54 is configured to adjust linearly a floating capacitor voltage of the inverter based on the adjusted direct current side voltage.

The second determining unit 55 is configured to determine whether the adjusted floating capacitor voltage is in a preset range, where the preset range ranges from a quarter of the operation voltage setting threshold minus a preset threshold to a quarter of the operation voltage setting threshold plus the preset threshold. The first controlling unit 52 is executed in a case that the adjusted floating capacitor voltage is in the preset range, and the second controlling unit 56 is executed in a case that the adjusted floating capacitor voltage is not in the preset range.

The second controlling unit 56 is configured to control the inverter to operate according to a seven level control strategy.

Figure 6:
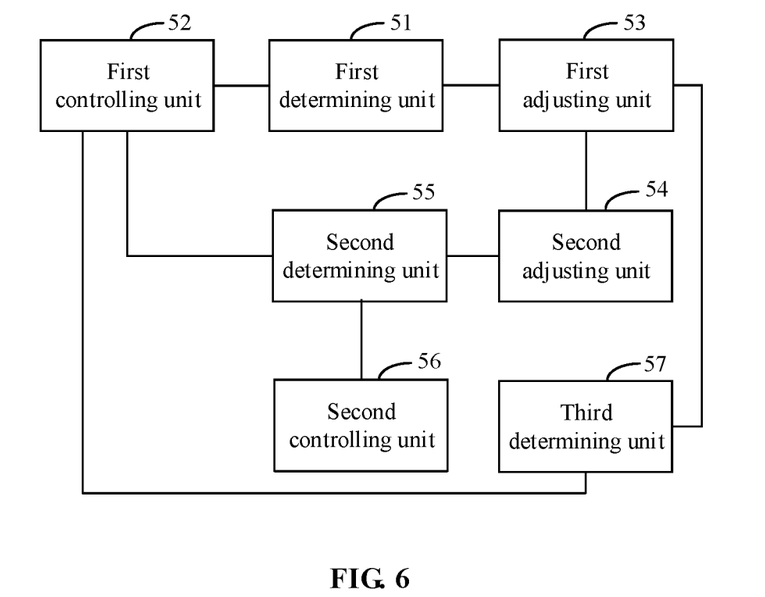
FIG. 6 is another schematic logic structural diagram of a device for controlling an operation of an inverter according to the disclosure.

In this embodiment, the device for controlling the operation of the inverter shown in FIG. 5 may further include a third determining unit 57 as shown in FIG. 6. The third determining unit 57 is configured to determine whether the direct current side voltage is greater than a first preset voltage, where the first preset voltage is greater than the operation voltage setting threshold. The first adjusting unit 53 is executed in a case that the direct current side voltage is greater than the first preset voltage, and the first controlling unit 52 is executed in a case that the direct current side voltage is not greater than the first preset voltage.

Figure 7:
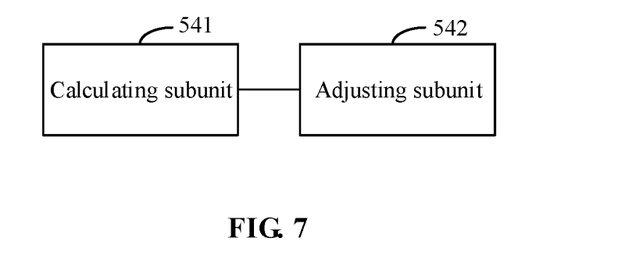
FIG. 7 is a schematic logic structural diagram of an adjusting unit according to the disclosure.

In this embodiment, the second adjusting unit 54 further includes: a calculating subunit 541 and an adjusting subunit 542, as shown in FIG. 7.

The calculating subunit 541 is configured to substitute the adjusted direct current side voltage into a preset linear relation formula to obtain a to-be-used floating capacitor voltage.

In this embodiment, the preset linear relation formula may be $$Y = \frac{U_{dc1} * U_{fc2} - U_{fc1} * U_{dc2}}{U_{dc1} - U_{dc2}} + \frac{U_{fc1} - U_{fc2}}{U_{dc1} - U_{dc2}} X,$$

where $U_{dc1}$ is a direct current side open-circuit voltage of the inverter, $U_{fc1}$ is a floating capacitor voltage corresponding to the direct current side open-circuit voltage of the inverter, $U_{dc2}$ is the operation voltage setting threshold, $U_{fc2}$ a floating capacitor voltage corresponding to the operation voltage setting threshold, X is the direct current side voltage of the inverter and Y is the floating capacitor voltage of the inverter.

The calculating subunit 541 is configured to substitute the adjusted direct current side voltage into $$Y = \frac{U_{dc1} * U_{fc2} - U_{fc1} * U_{dc2}}{U_{dc1} - U_{dc2}} + \frac{U_{fc1} - U_{fc2}}{U_{dc1} - U_{dc2}} X$$

to obtain a to-be-used floating capacitor voltage.

The adjusting subunit 542 is configured to adjust the floating capacitor voltage to the to-be-used floating capacitor voltage.

The above preset threshold is influenced by a specific circuit of an inverter or a photovoltaic system, the preset threshold may be variable. The above preset threshold may be, but not limited to, 20V.

Embodiment 4

In this embodiment, it is further provided an inverter including the device for controlling the operation of the inverter illustrated in the embodiment 3.

Of course, in this embodiment, it is further provided a photovoltaic power generation system including the above inverter.

It should be noted that, the various embodiments in the disclosure are described progressively. Each embodiment focuses on the difference from other embodiments. The same or similar parts of the various embodiments can be referred mutually. The device provided by the embodiment is described simply since it corresponds to the method provided by the embodiment, and part of the method description can be referred to, to explain the corresponding parts of the device.

Finally, it should be noted that, in the disclosure, relationship terms such as "first" and "second" are merely used to distinguish one entity or operation from another entity or operation, which does not require or indicate there exist any real relationships or sequences among those entities or operations. And terms "include", "contain" or any other variants mean to cover non-exclusive containing so to make a process, a method, a product or a device including a series of essential factors not only include these essential factors but also include those essential factors not clearly listed or further include fixed essential factors of the process, the method, the product or the device. In a situation without many limits, an essential factor limited by a sentence "include a . . . " does not exclude another same essential factor existing in a process, a method, a product or a device including the descried essential factor.

Above, a method and a device for controlling an operation of an inverter provided by the disclosure are specifically illustrated. A principle and the embodiments of the disclosure are illustrated by using specific examples in the description. The above description of the embodiments is used to help understanding a method and a core idea of the disclosure. In addition, for those skilled in the arts, according to the idea of the disclosure, a change is made in the specific embodiments and an applying filed. In summary, contents of the specification should not be understood to limit the disclosure.

The invention claimed is:

1. A method for controlling an operation of an inverter, comprising:
    determining whether a direct current side voltage of the inverter is greater than an operation voltage setting threshold; and
    in a case that the direct current side voltage of the inverter is not greater than the operation voltage setting threshold, controlling the inverter to operate according to a five level control strategy; and
    in a case that the direct current side voltage of the inverter is greater than the operation voltage setting threshold:
        adjusting the direct current side voltage by using a maximum power tracking algorithm;
        adjusting linearly a floating capacitor voltage of the inverter based on the adjusted direct current side voltage;
        determining whether the adjusted floating capacitor voltage is in a preset range, wherein the preset range ranges from a quarter of the operation voltage setting threshold minus a preset threshold to a quarter of the operation voltage setting threshold plus the preset threshold; and
        controlling the inverter to operate according to a five level control strategy in a case that the adjusted floating capacitor voltage is in the preset range; and
        controlling the inverter to operate according to a seven level control strategy in a case that the adjusted floating capacitor voltage is not in the preset range.

2. The method according to claim 1, wherein after controlling the inverter to operate according to the five level control strategy, the method further comprises:
    determining whether the direct current side voltage is greater than a first preset voltage, wherein the first preset voltage is greater than the operation voltage setting threshold; and
    executing a step of adjusting the direct current side voltage by using the maximum power tracking algorithm in a case that the direct current side voltage is greater than the first preset voltage; and
    controlling the inverter to operate according to the five level control strategy in a case that the direct current side voltage is not greater than the first preset voltage.

3. The method according to claim 2, wherein the adjusting linearly the floating capacitor voltage of the inverter based on the adjusted direct current side voltage comprises:
    substituting the adjusted direct current side voltage into a preset linear relation formula to obtain a to-be-used floating capacitor voltage; and
    adjusting the floating capacitor voltage to the to-be-used floating capacitor voltage.

4. The method according to claim 1, wherein the adjusting linearly the floating capacitor voltage of the inverter based on the adjusted direct current side voltage comprises:
    substituting the adjusted direct current side voltage into a preset linear relation formula to obtain a to-be-used floating capacitor voltage; and
    adjusting the floating capacitor voltage to the to-be-used floating capacitor voltage.

5. The method according to claim 4, wherein the preset linear relation formula is $$Y = \frac{U_{dc1} * U_{fc2} - U_{fc1} * U_{dc2}}{U_{dc1} - U_{dc2}} + \frac{U_{fc1} - U_{fc2}}{U_{dc1} - U_{dc2}} X,$$

wherein $U_{dc1}$ is a direct current side open-circuit voltage of the inverter, $U_{fc1}$ is a floating capacitor voltage corresponding to the direct current side open-circuit voltage of the inverter, $U_{dc2}$ is the operation voltage setting threshold, $U_{fc2}$ a floating capacitor voltage corresponding to the operation voltage setting threshold, X is the direct current side voltage of the inverter and Y is the floating capacitor voltage of the inverter.

6. A device for controlling an operation of an inverter, comprising:
    a first determining unit, configured to determine whether a direct current side voltage of the inverter is greater than an operation voltage setting threshold, wherein a first controlling unit is executed in a case that the direct current side voltage of the inverter is not greater than the operation voltage setting threshold, and a first adjusting unit is executed in a case that the direct current side voltage of the inverter is greater than the operation voltage setting threshold;
    the first controlling unit, configured to control the inverter to operate according to a five level control strategy;
    the first adjusting unit, configured to adjust the direct current side voltage by using a maximum power tracking algorithm;
    a second adjusting unit, configured to adjust linearly a floating capacitor voltage of the inverter based on the adjusted direct current side voltage;
    a second determining unit, configured to determine whether the adjusted floating capacitor voltage is in a preset range, wherein the preset range ranges from a quarter of the operation voltage setting threshold minus a preset threshold to a quarter of the operation voltage setting threshold plus the preset threshold, and wherein the first controlling unit is executed in a case that the adjusted floating capacitor voltage is in the preset range, and a second controlling unit is executed in a case that the adjusted floating capacitor voltage is not in the preset range; and
    the second controlling unit, configured to control the inverter to operate according to a seven level control strategy.

7. The device according to claim 6, further comprising:
    a third determining unit, configured to determine whether the direct current side voltage is greater than a first preset voltage, wherein the first preset voltage is greater than the operation voltage setting threshold, and wherein the first adjusting unit is executed in a case that the direct current side voltage is greater than the first preset voltage, and the first controlling unit is executed in a case that the direct current side voltage is not greater than the first preset voltage.

8. The device according to claim 7, wherein the second adjusting unit comprises:

a calculating subunit, configured to substitute the adjusted direct current side voltage into a preset linear relation formula to obtain a to-be-used floating capacitor voltage; and an adjusting subunit, configured to adjust the floating capacitor voltage to the to-be-used floating capacitor voltage.

9. The device according to claim 6, wherein the second adjusting unit comprises:

a calculating subunit, configured to substitute the adjusted direct current side voltage into a preset linear relation formula to obtain a to-be-used floating capacitor voltage; and an adjusting subunit, configured to adjust the floating capacitor voltage to the to-be-used floating capacitor voltage.

10. The device according to claim 9, wherein the calculating subunit is specifically configured to substitute the adjusted direct current side voltage into $$Y = \frac{U_{dc1} * U_{fc2} - U_{fc1} * U_{dc2}}{U_{dc1} - U_{dc2}} + \frac{U_{fc1} - U_{fc2}}{U_{dc1} - U_{dc2}} X$$

to obtain a to-be-used floating capacitor voltage, wherein $U_{dc1}$ is a direct current side open-circuit voltage of the inverter, $U_{fc1}$ is a floating capacitor voltage corresponding to the direct current side open-circuit voltage of the inverter, $U_{dc2}$ is the operation voltage setting threshold, $U_{fc2}$ a floating capacitor voltage corresponding to the operation voltage setting threshold, X is the direct current side voltage of the inverter and Y is the floating capacitor voltage of the inverter.

11. An inverter comprising a device for controlling an operation of an inverter, wherein the device for controlling an operation of an inverter comprises:

a first determining unit, configured to determine whether a direct current side voltage of the inverter is greater than an operation voltage setting threshold, wherein a first controlling unit is executed in a case that the direct current side voltage of the inverter is not greater than the operation voltage setting threshold, and a first adjusting unit is executed in a case that the direct current side voltage of the inverter is greater than the operation voltage setting threshold;

the first controlling unit, configured to control the inverter to operate according to a five level control strategy;

the first adjusting unit, configured to adjust the direct current side voltage by using a maximum power tracking algorithm;

a second adjusting unit, configured to adjust linearly a floating capacitor voltage of the inverter based on the adjusted direct current side voltage;

a second determining unit, configured to determine whether the adjusted floating capacitor voltage is in a preset range, wherein the preset range ranges from a quarter of the operation voltage setting threshold minus a preset threshold to a quarter of the operation voltage setting threshold plus the preset threshold, and wherein the first controlling unit is executed in a case that the adjusted floating capacitor voltage is in the preset range, and a second controlling unit is executed in a case that the adjusted floating capacitor voltage is not in the preset range; and the second controlling unit, configured to control the inverter to operate according to a seven level control strategy.

12. The inverter according to claim 11, further comprising:

a third determining unit, configured to determine whether the direct current side voltage is greater than a first preset voltage, wherein the first preset voltage is greater than the operation voltage setting threshold, and wherein the first adjusting unit is executed in a case that the direct current side voltage is greater than the first preset voltage, and the first controlling unit is executed in a case that the direct current side voltage is not greater than the first preset voltage.

13. The inverter according to claim 11, wherein the second adjusting unit comprises:

a calculating subunit, configured to substitute the adjusted direct current side voltage into a preset linear relation formula to obtain a to-be-used floating capacitor voltage; and an adjusting subunit, configured to adjust the floating capacitor voltage to the to-be-used floating capacitor voltage.

14. The inverter according to claim 13, wherein the calculating subunit is specifically configured to substitute the adjusted direct current side voltage into $$Y = \frac{U_{dc1} * U_{fc2} - U_{fc1} * U_{dc2}}{U_{dc1} - U_{dc2}} + \frac{U_{fc1} - U_{fc2}}{U_{dc1} - U_{dc2}} X$$

to obtain a to-be-used floating capacitor voltage, wherein $U_{dc1}$ is a direct current side open-circuit voltage of the inverter, $U_{fc1}$ is a floating capacitor voltage corresponding to the direct current side open-circuit voltage of the inverter, $U_{dc2}$ is the operation voltage setting threshold, $U_{fc2}$ a floating capacitor voltage corresponding to the operation voltage setting threshold, X is the direct current side voltage of the inverter and Y is the floating capacitor voltage of the inverter.

* * * * *